Figures 1, 2:
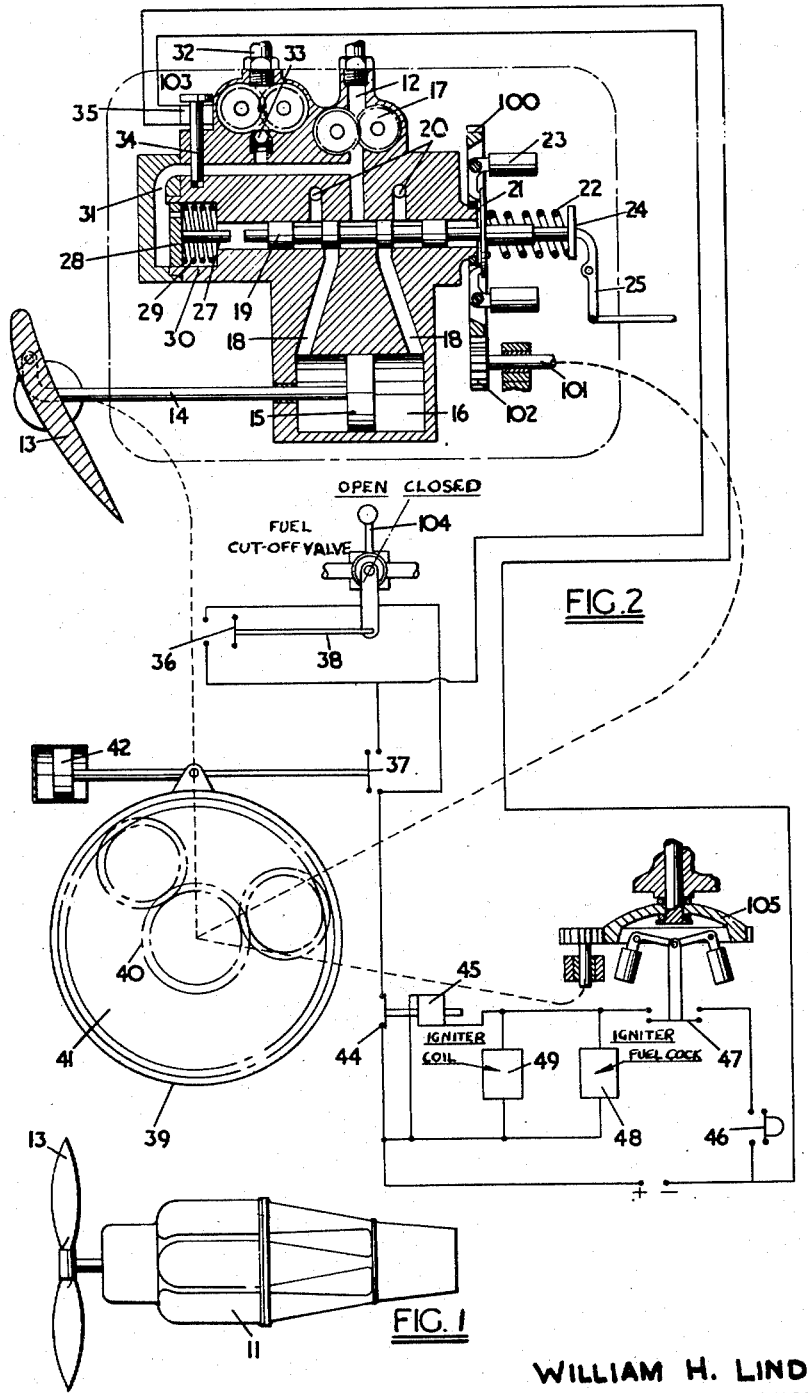

Oct. 10, 1950  W. H. LINDSEY ET AL  2,525,694
CONTROL MEANS FOR TURBO-PROP UNITS
Filed Dec. 5, 1946

Inventors
WILLIAM H. LINDSEY &
BRIAN H. SLATTER
By Mawhinney & Mawhinney
Attorneys Patented Oct. 10, 1950

2,525,694

UNITED STATES PATENT OFFICE 2,525,694

CONTROL MEANS FOR TURBO-PROP UNITS

William Henry Lindsey and Brian Hudson Slatter, Coventry, England, assignors to Armstrong Siddeley Motors Limited, Coventry, England Application December 5, 1946, Serial No. 714,294
In Great Britain February 28, 1946

6 Claims. (Cl. 170—135.72)

This invention relates to a constant-speed, variable-pitch propeller driven by an internal-combustion turbine unit, for use in an aircraft. The constant-speed mechanism is adjustable by the pilot's main control.

In the case of a constant-speed, variable-pitch air-screw driven by a reciprocating engine, it is usual to provide a fine pitch stop—i. e., a stop which will limit the extent to which the air-screw blades may be moved towards the minimum pitch position—as otherwise considerable drag would be introduced in the event of an engine failing, and there would then be a likelihood of the aircraft becoming uncontrollable as a result of the drag, especially in the case of a multi-engined aircraft.

When, however, the power unit is an internal-combustion turbine unit, it is desirable that the air-screw blades should be moved almost or fully to the minimum pitch position to facilitate the starting and running up of the unit before take-off.

It is our main object to provide a satisfactory solution to these conflicting requirements.

According to the main feature of the invention, a constant-speed, variable-pitch air-screw, driven by an internal-combustion turbine unit, has no ordinary fine pitch stop (such as that above referred to) so that the blades may be moved almost or fully to the zero pitch position, in order to facilitate starting of the unit; but to obviate the possibility of the blades being moved fully to the fine pitch position in the event of engine failure, we provide an over-ride, for the governor-actuated member of the constant-speed mechanism, which is automatically brought into operation (by the action of the torque meter of the unit, or by the pilot's movement of the fuel shut-off valve to the fuel-off position) when the turbine unit ceases to deliver power to the air-screw and by which the constant-speed mechanism will actuate the blades towards the maximum pitch or feathering position, in which the drag is a minimum. Naturally, stops should be provided, if necessary, to prevent the blades from moving beyond either the minimum (zero) pitch position or the feathering position.

A very satisfactory known form of constant-speed mechanism is a hydraulic one for which motive fluid is supplied by a pump operated by the power unit, the governor aforesaid acting upon the valve of the constant-speed mechanism, and with such a mechanism the over-ride conveniently includes a spring-pressed element, which may be operated by hydraulic means controlled either electrically or by hydraulic means, and which when brought into operation acts upon the said valve in opposition to the governor. The hydraulic circuit for the over-ride may be supplied from the main hydraulic circuit of the constant-speed mechanism. When the over-ride is electrically controlled, this may involve a solenoid-operated valve for the hydraulic circuit of the over-ride, the solenoid circuit being controlled by parallel switches one of which is mechanically connected with the fuel-isolator valve, or the actuating mechanism therefor, and the other with the torque meter of the turbine unit.

In the case of a hydraulic, constant-speed mechanism normally supplied with motive fluid from the turbine unit, and having an auxiliary pump for supplying the constant-speed mechanism for feathering purposes when the normal supply falls off due to the turbine unit failing or being shut down, a further feature of the invention involves supplying the over-ride from the same source.

The invention further involves the combination with a constant-speed, variable-pitch propeller, driven by an internal-combustion turbine unit and operable as previously described, of control means by which the over-ride is automatically put out of action by the pilot upon switching on the unit or carrying out an equivalent operation with the intention of causing the engine to start by "wind-milling," and by which the over-ride is automatically restored when the speed of the unit rises to a predetermined value (above that at which the unit should be self-operating) if, at that speed, the unit is not self-operating.

In the accompanying drawings—

Figure 1 is an elevational view of a constant-speed, variable-pitch propeller, driven by a gas turbine unit, arranged according to the invention; and Figure 2 is a diagram illustrating the means by which the propeller is controlled.

Figure 2 shows what is, in fact, a known form of hydraulic constant-speed mechanism for which motive fluid is supplied along the pipe line 12 by a pump (not shown) operated by the turbine unit 11 (Figure 1) by which the variable-pitch air-screw is driven. One blade of the air-screw is shown at 13, this being connected to a rod 14 of the constant-speed mechanism so that its pitch will be varied as necessary in response to axial movement of the rod. The rod is fast with a two-way acting plunger 15 operable along a hydraulic cylinder 16. The cylinder ends provide stops for the plunger corresponding to the zero pitch and fully feathered positions.

Interposed in the pipe line 12 is a booster pump 17, and admission of motive fluid from the pipe line to the passages 18, 18 (leading to the opposite ends of the cylinder 16, respectively) is controlled by a waisted piston valve 19, which is shown in its neutral position. When moved therefrom to supply one of the passages 18 the other passage 18 is placed thereby in communication with the associated exhaust passage, indicated at 20—as will be readily apparent from consideration of the drawing.

The valve 19 has a head 21 one side of which is engaged by a compression spring 22 and the other side by a governor, indicated diagrammatically at 23 (which is shown mounted on a gear ring 100 driven from a shaft 101 by a pinion 102), which is responsive to the speed of the turbine unit. The abutment 24 for the spring 22 is adjustable by means of a lever 25 which is connected to the throttle or other main control of the turbine unit.

At the other end of the valve 19 is disposed the over-ride of the invention. This includes a stem 27 coaxial with the valve and fast with a plunger 28 which is pressed by a spring 29 to an inoperative position as shown. The plunger works in a cylinder 30 the operative end of which is connected with the pipe line 12 by a pipe line 31. An additional source of motive fluid is available (when the speed of the turbine unit is below a suitable value) for the constant-speed mechanism and for the over-ride from an auxiliary feathering pump 103 by way of a pipe line 32 and non-return valve 33.

The supply of motive fluid to the cylinder 30 is, however, normally disconnected by means of a valve 34 which is operable by a solenoid 35. The circuit for the latter includes two switches in parallel—namely, a fuel-shut-off switch 36 which is only closed when the fuel-shut-off valve 104 is closed (to shut off the fuel supply) and a torque meter switch 37 which is normally open but which is closed when the air-screw "windmills" the turbine unit. 38 represents a connection between the switch 36 and the fuel-shut-off valve 104, and 39 represents the torque meter. This is shown diagrammatically as including a sun gear 40, on the turbine rotor, operating on a disc 41 by means of an epicyclic reduction gear, the disc being connected both with the switch 37 and with a plunger 42 working in the torque meter cylinder.

Thus, if the turbine unit should be shut down or fail, the lower speed of the governor 23 would normally allow the spring 22 to force the valve 19 to the left, thus supplying motive fluid to the left-hand end of the cylinder 16 and initiating the movement of the blades towards the minimum pitch position. As soon as the pilot closes the fuel-shut-off valve, however, and thereby closes the switch 36, a circuit is completed for the solenoid 35 which therefore lifts the valve 34 and allows motive fluid to be applied to the over-ride. The stem 27 of the latter thereby acts on the valve 19 and moves it to the right, causing motive fluid to be supplied to the right-hand end of the cylinder 16 thereby moving the blades towards the feathering position. Alternatively, the reversal of torque acting on the torque meter will close the switch 37, which can thus complete a circuit for the solenoid 35 independently of the switch 36.

The drawing also shows a switch 44, which is normally closed, in the circuit of the solenoid 35 and this switch is also controlled by a solenoid, marked 45. The circuit for the latter includes the pilot's igniter switch 46 and a switch 47 operated by a governor 105 which is driven similarly to the governor 23, the switch 47 opening when the turbine unit reaches a speed of, say 2,000 R. P. M. Also controlled by igniter switch 46 is the igniter fuel cock 48 and the igniter coil 49.

Thus, to start the turbine unit by "windmilling," the pilot opens the fuel shut-off valve 104, this opening the switch 36, and closes the igniter switch 46, thus energizing the igniter coil 49 and the igniter fuel cock 48. The switch 47 is closed until the turbine unit reaches the predetermined speed (of, say, 2,000 R. P. M.), and the solenoid 45 is therefore energized to open the switch 44, thus de-energizing the solenoid 35 and rendering the over-ride inoperative.

Thus, if one assumes, for example, that the turbine unit should be capable of self-operation at a speed of about 1,800 or 2,000 R. P. M., when the over-ride has been put out of action (thereby allowing the blade pitch to be uncoarsened by the constant-speed mechanism), and the unit has been "wind-milled" up to a speed, say, of 2,300 R. P. M., if at that speed the unit is not self-operating, due to some failure in the unit, it is important that the over-ride should be restored, in order to prevent the blades from being moved further towards the minimum pitch position, in which case excessive drag would be encountered. In the present instance the over-ride is restored by the opening of the switch 47. As soon as the over-ride is restored in this way the propeller blades will be moved again towards the feathering position, as a result of which the speed of the unit will fall well below the predetermined value above mentioned. In these conditions the control means can again operate to put the over-ride out of action for a second time, and so on. The pilot will, of course, be advised that something is wrong by observing the speed indicator of the unit, which will oscillate between the said predetermined value at which the over-ride is restored, and a lower value at which it is again put out of action.

Naturally, as soon as the turbine unit is self-operating the circuit for the over-ride will additionally be opened by means of the torque meter switch 37.

It should be understood that the propeller and the governors 23 and 105, as well as the sun gear 40, are all connected, directly or indirectly, to be driven from the turbine unit, as is indicated diagrammatically by the dotted lines 106.

What we claim as our invention and desire to secure by Letters Patent of the United States is:

1. The combination with a gas turbine unit, of a variable-pitch propeller driven thereby, a constant-speed mechanism for varying the pitch of said propeller so as to substantially maintain the speed of said turbine unit at a constant value, said constant-speed mechanism having a movable control member actuated responsively to the speed of said turbine unit, a movable over-ride member associated with said control member such that, when said over-ride member is operated, said control member will cause said constant-speed mechanism to operate said propeller towards the maximum pitch position, operating means for said over-ride member, control means operable when said turbine unit ceases to deliver the power to said propeller for operating said operating means to operate said over-ride member as aforesaid, further control means for rendering said operating means inoperative when an attempt is made to start said turbine unit by "windmilling," and means responsive to the speed of said turbine unit when "windmilling" for rendering said further control means inoperative, whereby to again operate said over-ride member, when the speed of said turbine unit rises to a predetermined value above that at which said unit should be self-operating if, at that predetermined speed, said unit is not self-operating.

2. The combination of claim 1, characterised in that said movable control member and said over-ride member are both rectilinearly slidable and aligned with one another.

3. The combination of claim 2, and including also hydraulic means for actuating said over-ride member, said operating means taking the form of an electrically-operated hydraulic valve.

4. The combination of claim 3, characterised in that said first-mentioned control means includes two switches connected in parallel in a circuit for said electrically-operated hydraulic valve, namely, a fuel shut-off switch, and a switch controlled by the torque of said turbine unit.

5. The combination of claim 4, characterised in that said further control means includes a further switch in said circuit in series with said parallel switches, a control circuit for said further switch including a switch operable by the said means responsive to the speed of said turbine unit.

6. The combination with a gas turbine unit, of a variable-pitch propeller driven thereby, a hydraulic device for changing the pitch of said propeller, a source of hydraulic pressure, a slidable valve for controlling the supply of said hydraulic pressure to said hydraulic device, a spring biassing said valve in the direction such that said propeller will be operated towards the minimum pitch position, a governor responsive to the speed of said turbine unit and acting in opposition to said spring to bias said valve in the other direction so that as the speed of said turbine unit tends to increase said propeller will be operated towards the maximum pitch position whereby to maintain the speed of said turbine unit substantially constant for a given setting of said governor, an over-ride plunger associated with said valve to also act in opposition to said valve spring, a spring biassing said over-ride plunger to an inoperative position, operating means to supply said hydraulic pressure to said over-ride plunger whereby to cause said propeller to be operated towards the maximum pitch position, control means, automatically operable when said turbine unit ceases to deliver power to said propeller, to actuate said operating means, further control means by which said operating means is automatically rendered inoperative when an attempt is made to start said turbine unit by "windmilling," and means responsive to the speed of said turbine unit when "windmilling" by which said further control means is rendered inoperative so that said hydraulic pressure will again be supplied to said over-ride plunger when the speed of said turbine unit rises to a predetermined value above that at which said turbine unit should be self-operating if, at that predetermined speed, said turbine unit is not self-operating.

WILLIAM HENRY LINDSEY.
BRIAN HUDSON SLATTER.

REFERENCES CITED

The following references are of record in the file of this patent:

UNITED STATES PATENTS

| Number | Name | Date |
| --- | --- | --- |
| 2,320,195 | Rindfleisch | May 25, 1943 |
| 2,322,303 | Martin | June 22, 1943 |
| 2,339,090 | McIntosh | Jan. 11, 1944 |
| 2,374,276 | French | Apr. 24, 1945 |
| 2,391,323 | Martin | Dec. 18, 1945 |

FOREIGN PATENTS

| Number | Country | Date |
| --- | --- | --- |
| 495,444 | Great Britain | Nov. 11, 1938 |